Jan. 27, 1931.  A. W. SMITH ET AL  1,790,172
HEATING FURNACE
Filed May 13, 1922  13 Sheets-Sheet 1

INVENTORS
Albert W. Smith
Richard B. Jones
By Byrnes Stebbins Burgess Parmelee
their Attorneys Jan. 27, 1931.    A. W. SMITH ET AL    1,790,172
HEATING FURNACE
Filed May 13, 1922    13 Sheets-Sheet 5

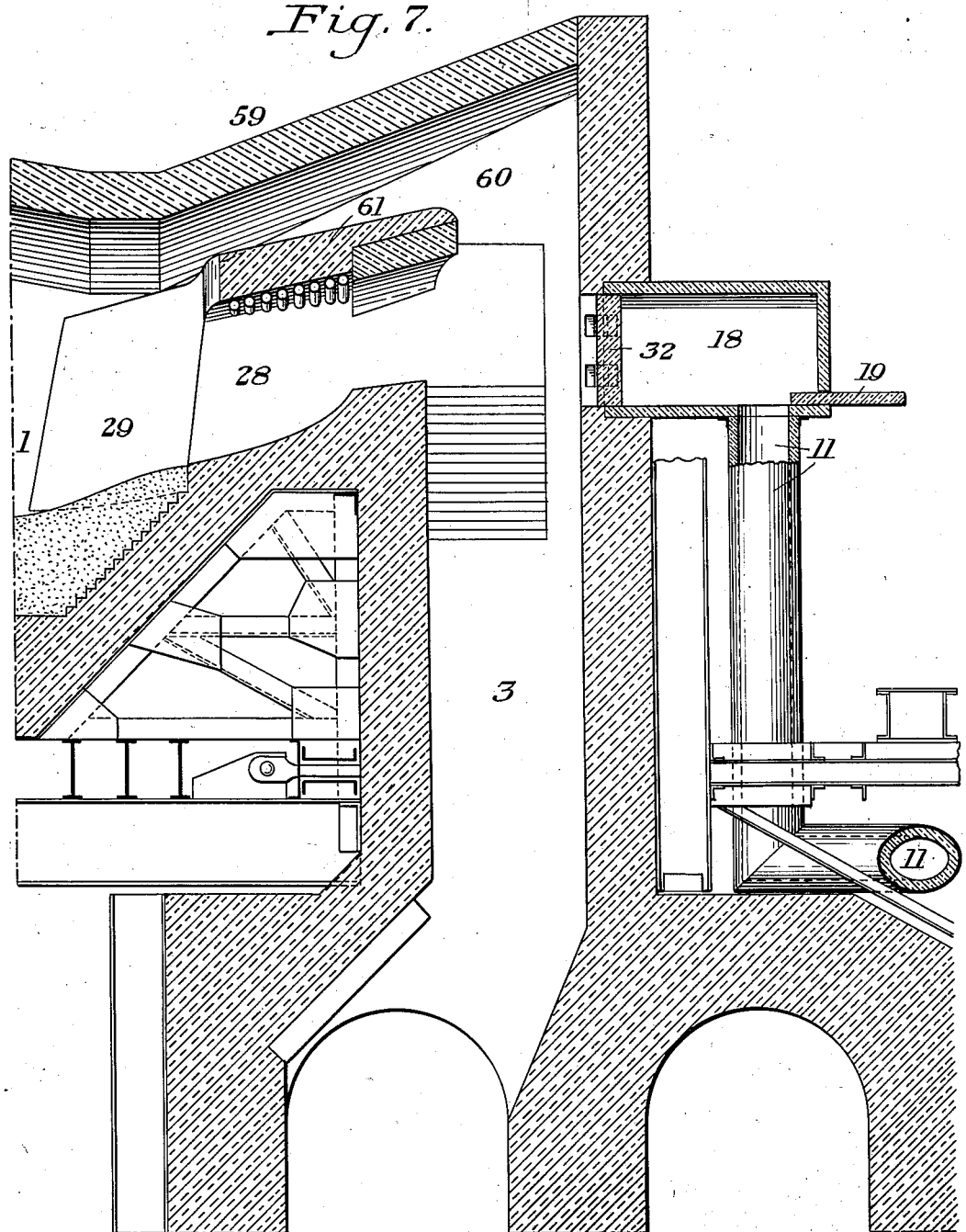

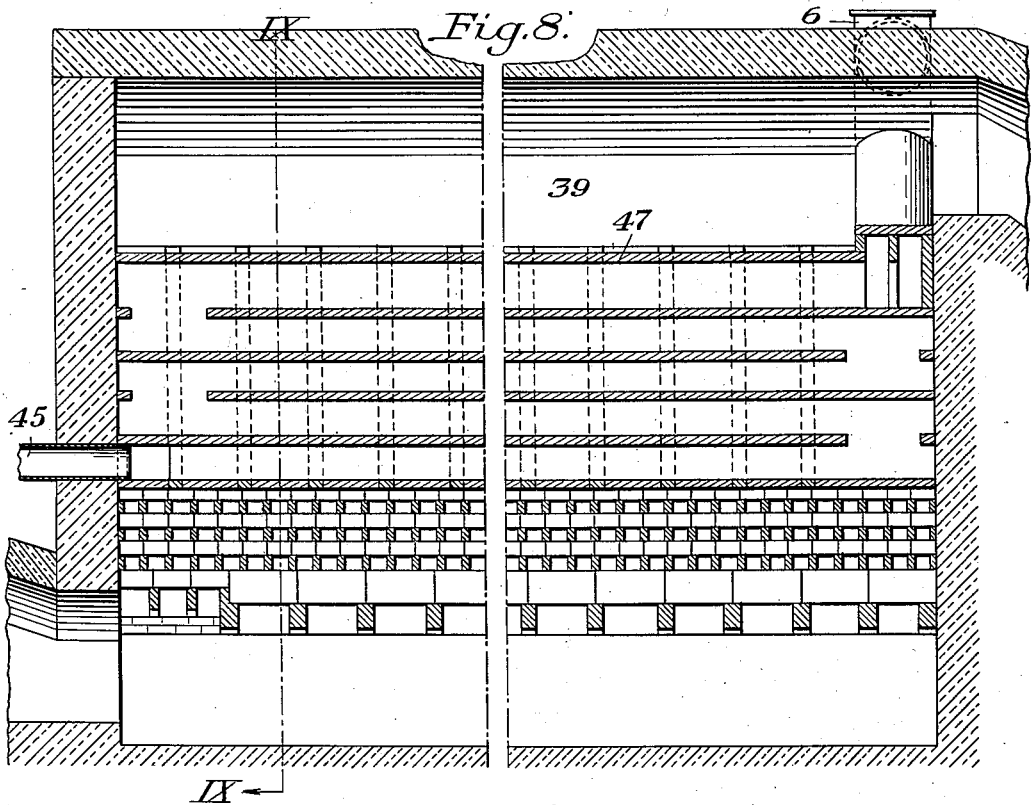
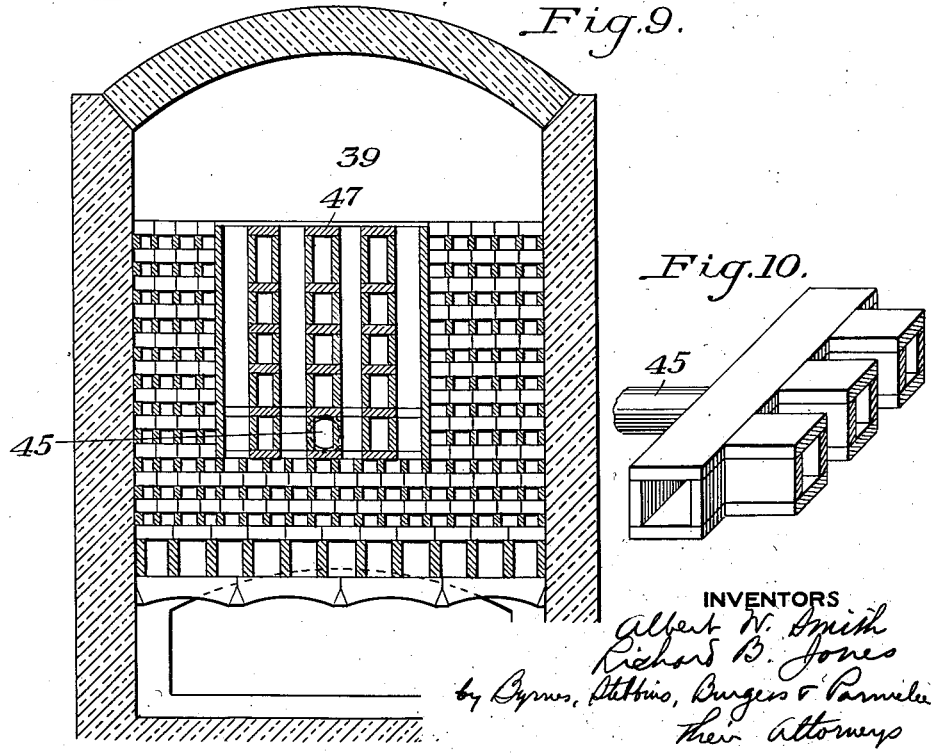
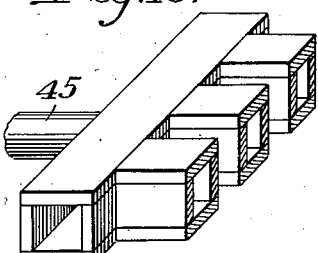

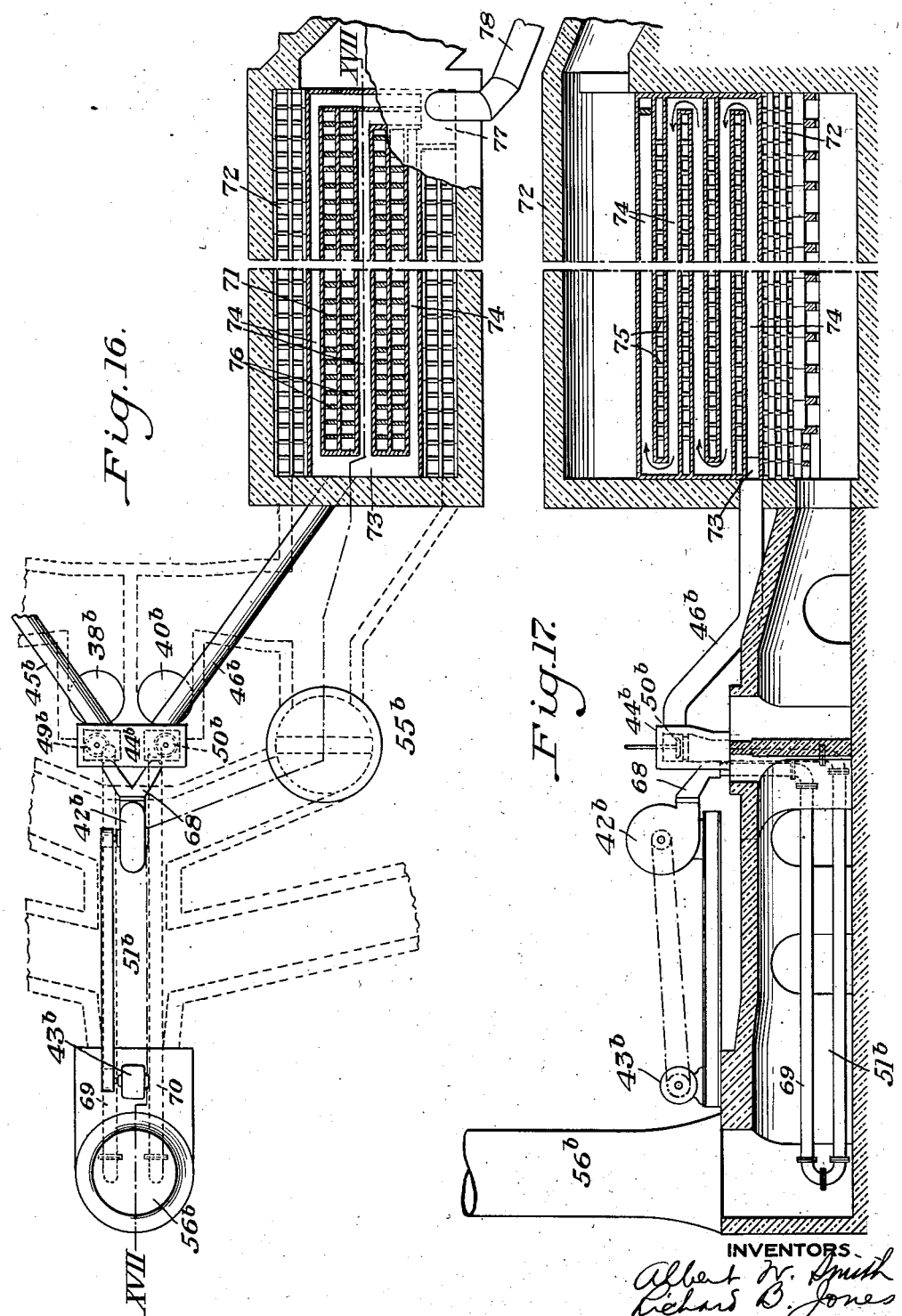

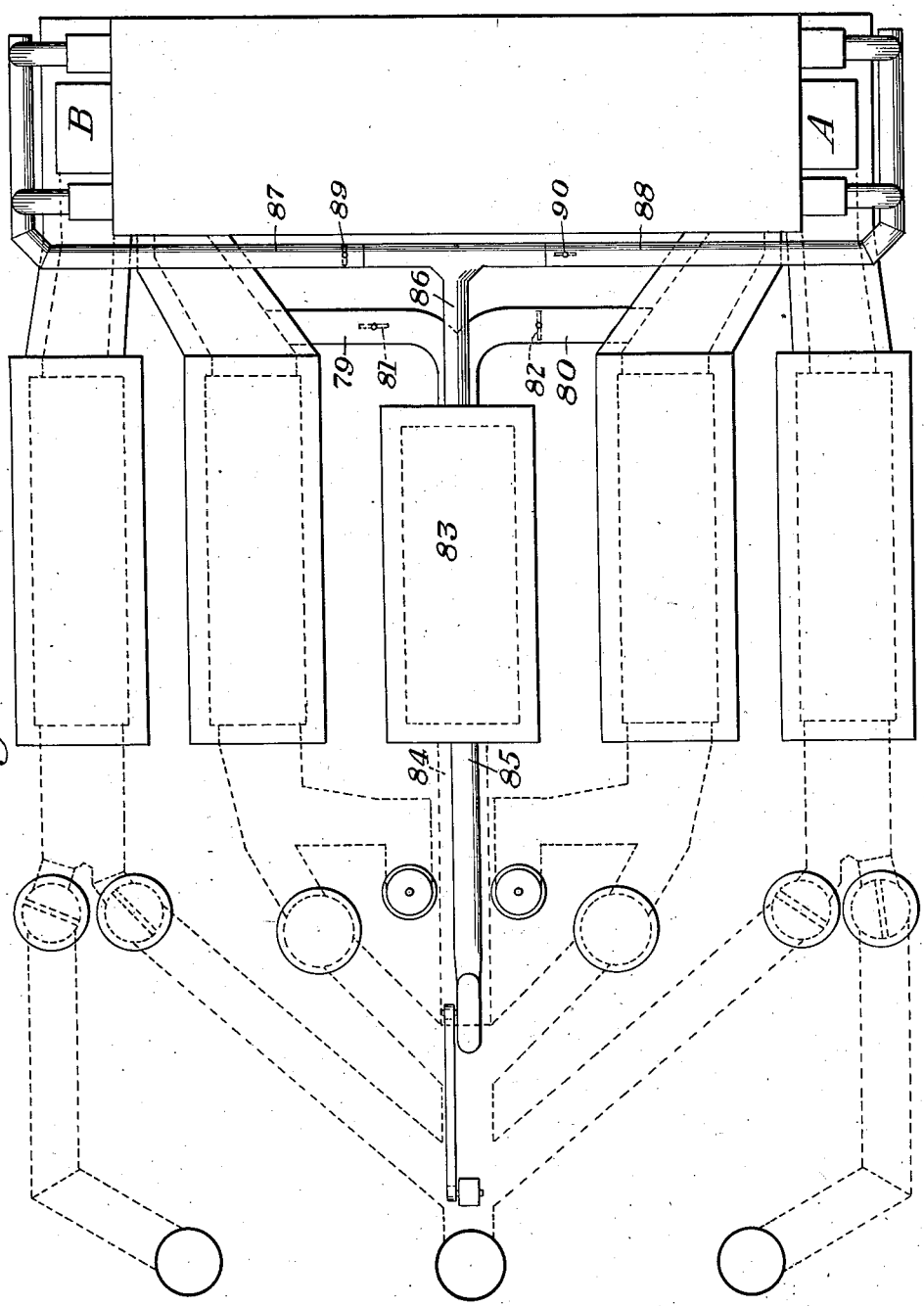

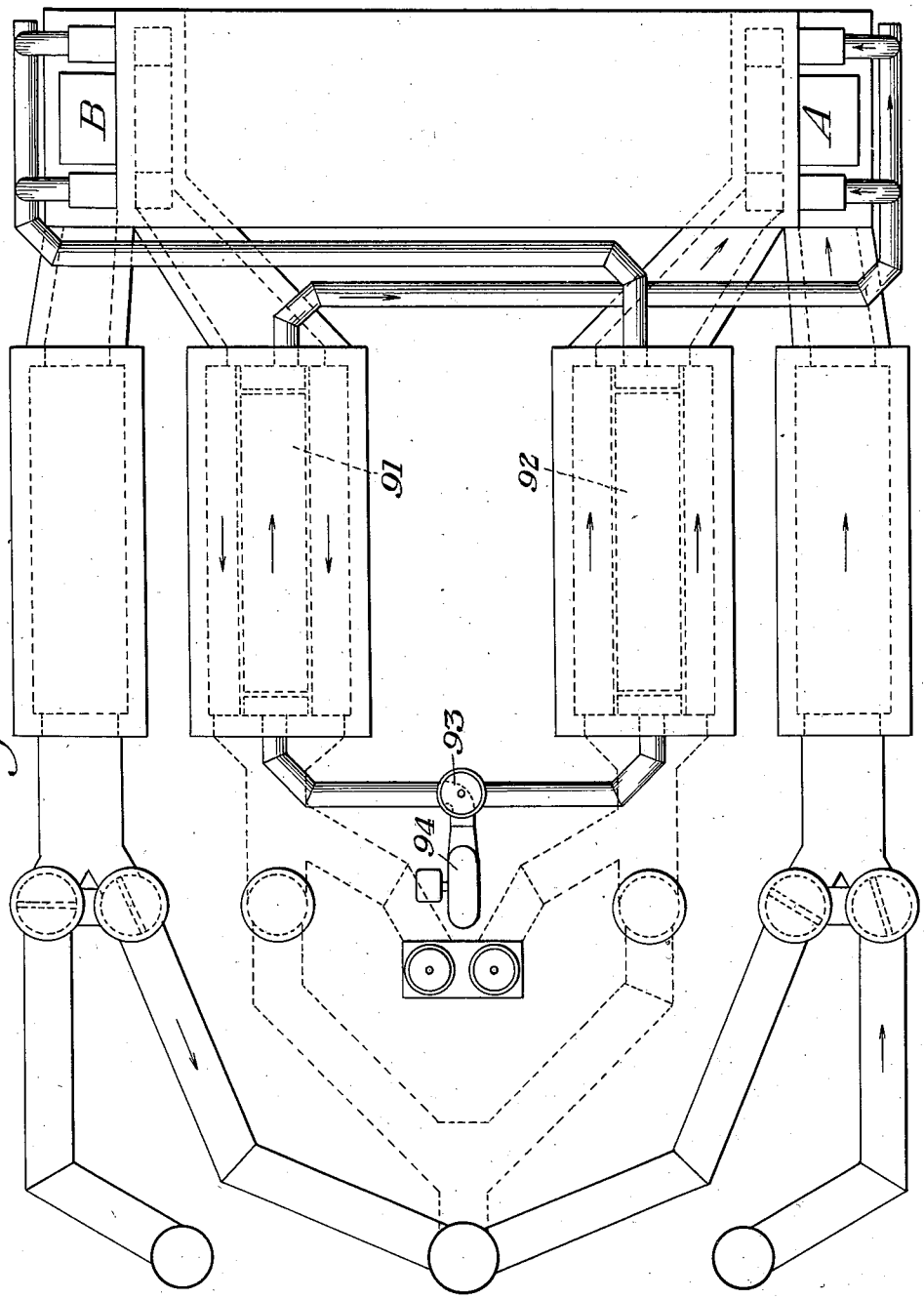

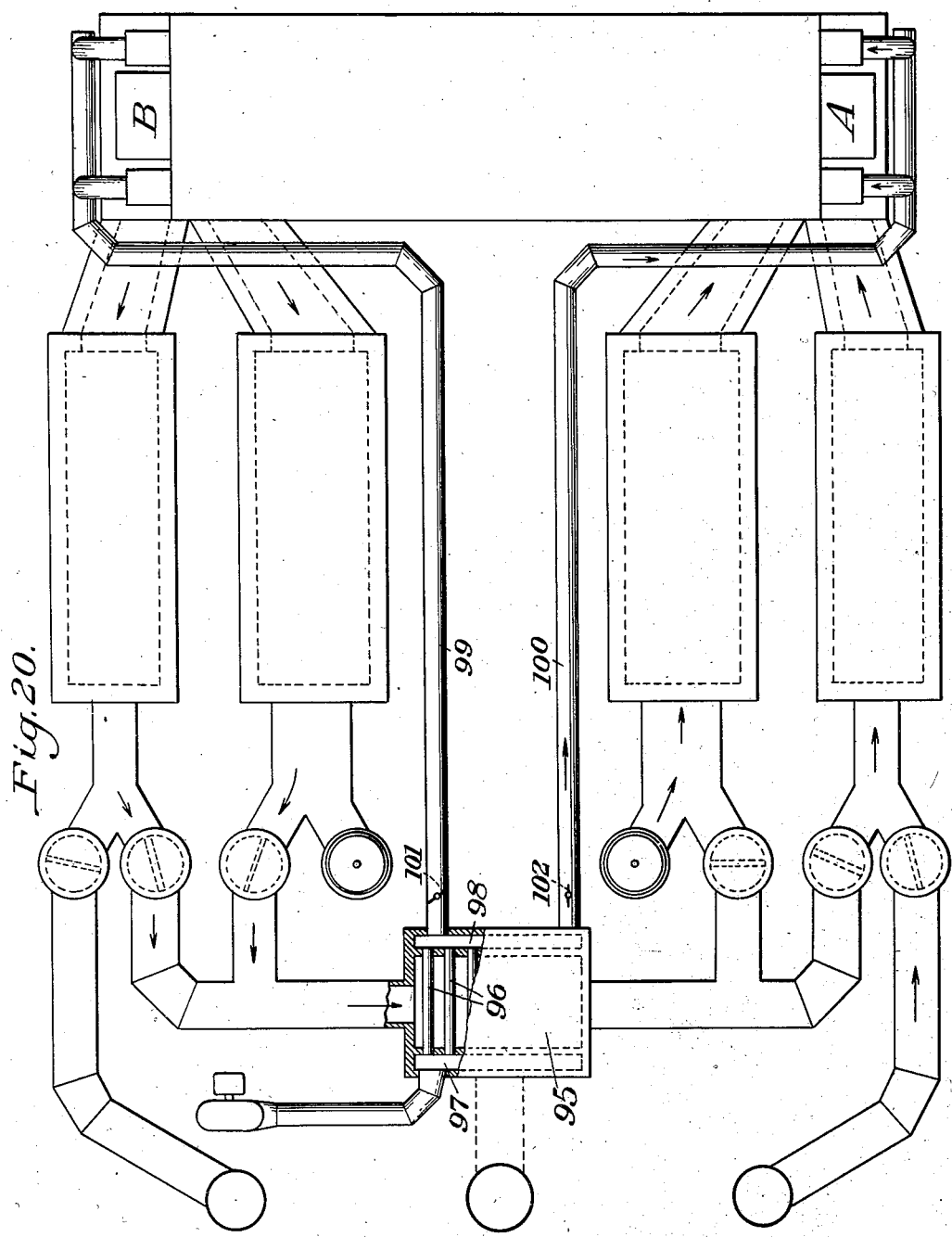

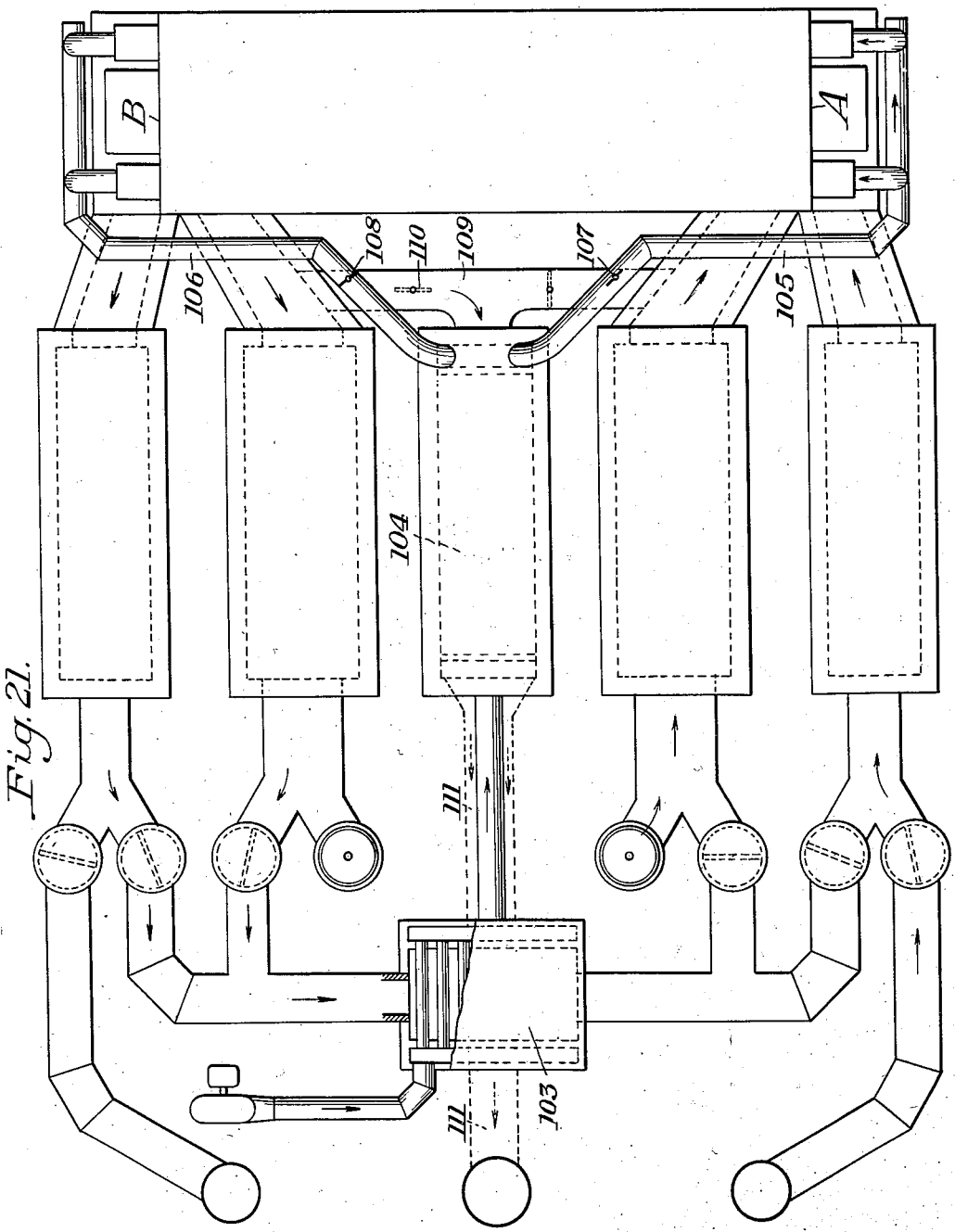

Patented Jan. 27, 1931

1,790,172

UNITED STATES PATENT OFFICE

ALBERT W. SMITH AND RICHARD B. JONES, OF YOUNGSTOWN, OHIO

HEATING FURNACE

Application filed May 13, 1922. Serial No. 560,674.

Our invention relates to heating furnaces and particularly to open hearth furnaces.

Heretofore the ports of such furnaces have been designed to act as inlet ports for the constituents of the combustible mixture and also as exhaust ports for the waste gases. Due to expansion from increased temperature the volume of the waste gases is substantially larger than that of the combustible gases at the inlet ports. The ports have therefore been designed so as to handle the large volume of the waste gases and as a result, the combustible gases have not been efficiently and thoroughly mixed and combustion has therefore been incomplete in the heating chamber. As a result of the above conditions the outgoing gases in such furnaces are at such a temperature as to have a very destructive action on the walls of the exhaust ports and offtakes. The incomplete combustion also occasions a considerable loss of fuel and a resultant decrease in the production of the furnaces with a corresponding increase in the cost thereof.
Attempts have been made to overcome the above noted difficulties by providing separate inlet and outlet passages at each end of the furnaces. This necessitates movable parts to change the area of the ports when the furnace is reversed. These means have many disadvantages in that they are expensive and further means must be provided for operating the movable parts and cooling means must also be provided therefor.
By the use of our invention, a furnace is provided which is free from the objectionable features and means above referred to; an efficient mixture of the constituents of the fuel is produced by the use of gaseous blasts which are arranged to localize the fuel mixing area in the ports, thus effectively decreasing the area of the ports when acting as inlet ports without changing the actual area thereof. Our arrangement produces a complete combustion and provides adequate offtakes for the waste gases without any movable parts.

This application is a continuation in part of our application Serial No. 491,716, filed August 12, 1921.

Our invention will be better understood by reading the following description, taken in connection with the accompanying drawings forming a part thereof, and in which—

Figure 7 is a section on line VII—VII of Figure 3;

Figure 8 is a longitudinal vertical section of one of the air regenerators shown in Figure 1 with the middle portion omitted;

Figure 9 is a section on line IX—IX of Figure 8;

Figure 10 is a perspective detail view of the header used in the blast lines;

Figure 11 is a side elevation of the blast lines and part of the air regenerator shown in Figure 1;

Figure 12 is a section of the wind box on line XII—XII of Figure 1;

Figure 16 is a plan view of a modification showing the air regenerator partially in section;

Figure 17 is a section on line XVII—XVII of Figure 16;

Figure 18 is a diagrammatic plan view of a modified layout showing a recuperator for the blast lines separate from the regenerators;

Figure 19 is a plan view of a further modified layout showing recuperators for the blast lines in the air regenerators;

Figure 20 is a plan view of a further modified layout showing a recuperator for the blast lines in the stack flue, and Figure 21 is a plan view of a further modified layout showing two recuperators in series for the blast lines.

Figure 1:
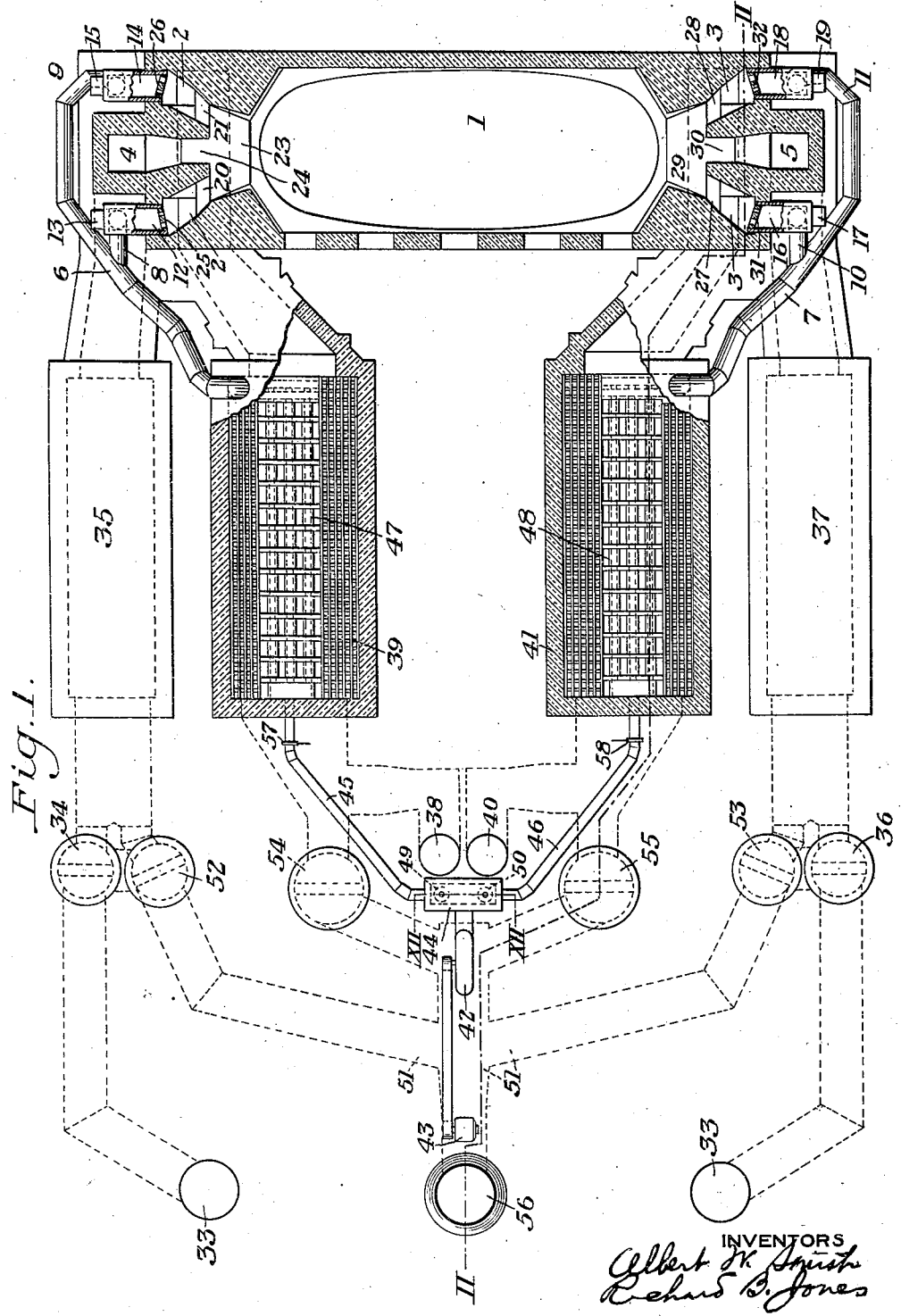
Figure 1 is a plan view of a furnace outlay embodying our invention, certain parts being shown in section.

Referring to the drawings, and particularly to Figure 1, the arrangement shown comprises a furnace having a hearth 1 of any desired construction. The ends of the furnace are provided with the usual air uptakes 2 and 3 and the gas uptakes 4 and 5. The furnace is also provided at its ends with blast lines 6 and 7. The line 6 is divided, one branch 8 leading to one side of the furnace and the branch 9 leading to the other side at the same end. The line 7 is likewise divided, one branch 10 leading to one side of the furnace and the branch 11 leading to the other side of the furnace at the same end. The branch 8 leads into the chamber 12 and the connection between the branch 8 and chamber 12 is controlled by a slide valve 13. The branch 9 leads into a chamber 14 and is controlled by a valve 15. The branch 10 leads into a chamber 16 and is controlled by a valve 17. The branch 11 leads into a chamber 18 and is controlled by a valve 19. The air or other gaseous medium forced into the chambers 12 and 14 passes therefrom through converging passages 20 and 21, which cross the upper ends of the air uptakes 2 as shown in Figure 1. The two converging streams which pass through the passages 20 and 21 meet in a mixing chamber 23 which is between the hearth 1 and the gas uptake 4. The gas uptake 4 communicates with the mixing chamber 23 through a port 24. The blasts from the chambers 12 and 14 pass through the perforated members 25 and 26. When the blast is on the line 6 the opposite end of the furnace is the discharge end and the waste gases pass out from that end as will be explained later.

When the blast is on the line 7, the chambers 16 and 18 will be filled and will discharge in two converging streams through the passages 27 and 28 into a mixing chamber 29 similar to the chamber 23. The gas uptake 5 communicates with the mixing chamber 29 through a port 30. The gaseous medium from the chambers 16 and 18 passes into the passages 27 and 28, respectively, through perforated members 31 and 32.

The gas from the uptake 4 is supplied from any suitable source 33 and is conducted through valve 34 and regenerator 35 in which the gas is preheated in the ordinary way. The gas for the uptake 5 is likewise supplied from any suitable source 33 through a valve 36 and a regenerator 37. The air for the uptakes 2 is supplied through valve 38 and is conducted through an air regenerator 39 to the uptakes. The air for the uptakes 3 is supplied through a valve 40 and passes through an air regenerator 41 to the uptakes. The air for the blast lines 6 and 7 is supplied from a fan 42 driven by a motor 43 through a belt or other suitable means. The fan 42 discharges into a wind box 44 to the ends of which are connected blast lines 45 and 46. The lines 45 and 46 connect with regenerators 47 and 48 respectively, which are placed in the air regenerators 39 and 41 respectively. The blast line 6 is connected with the other end of the regenerator 47 and the blast line 7 is connected with the other end of regenerator 48. Valves 49 and 50 connect the lines 45 and 46 respectively, with the wind box 44. The detailed arrangement of these valves is shown in Figure 12. The valves may be operated by any suitable means, not shown.

Figure 2:
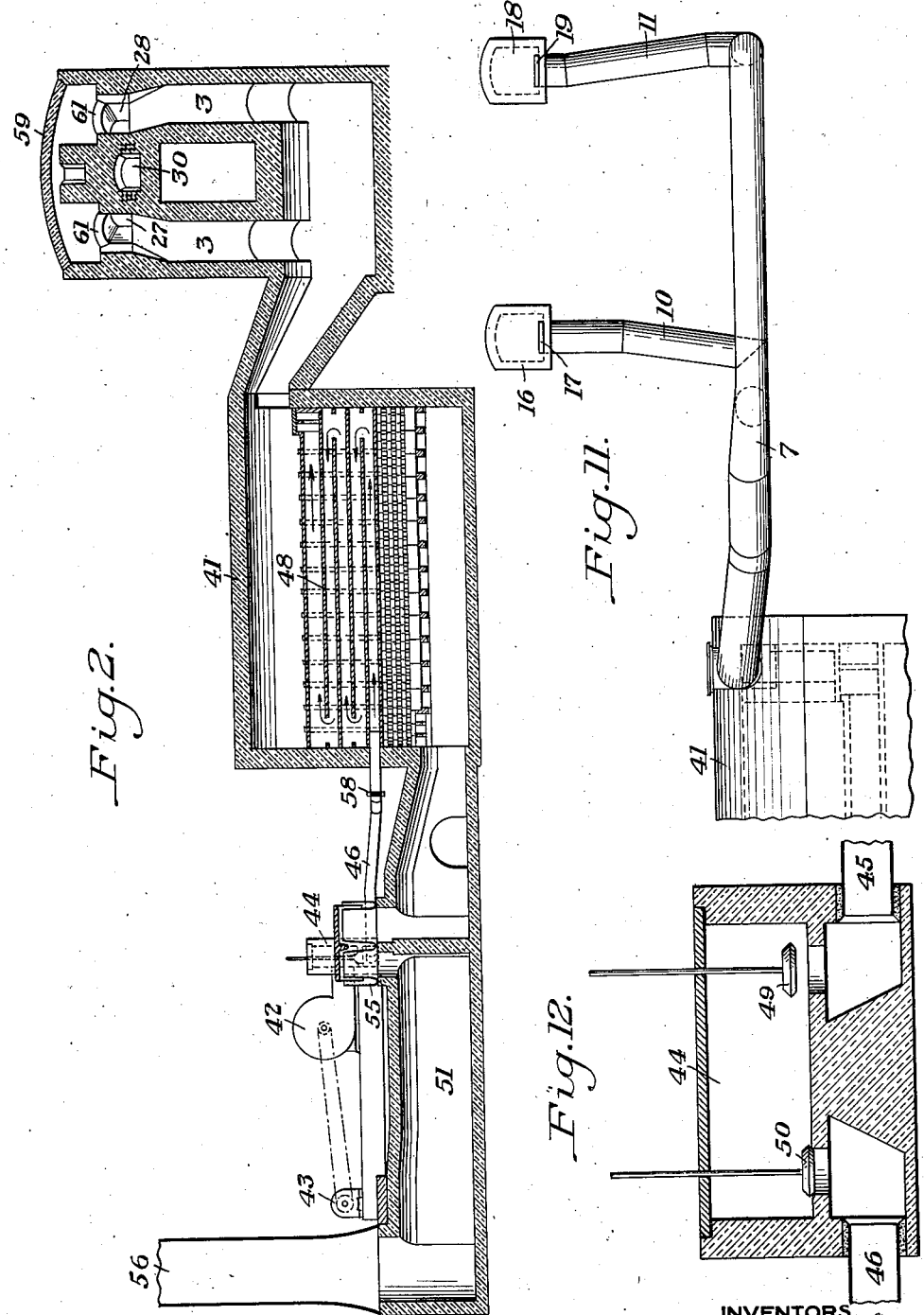
Figure 2 is a longitudinal vertical section on line II—II of Figure 1.
Figure 3:
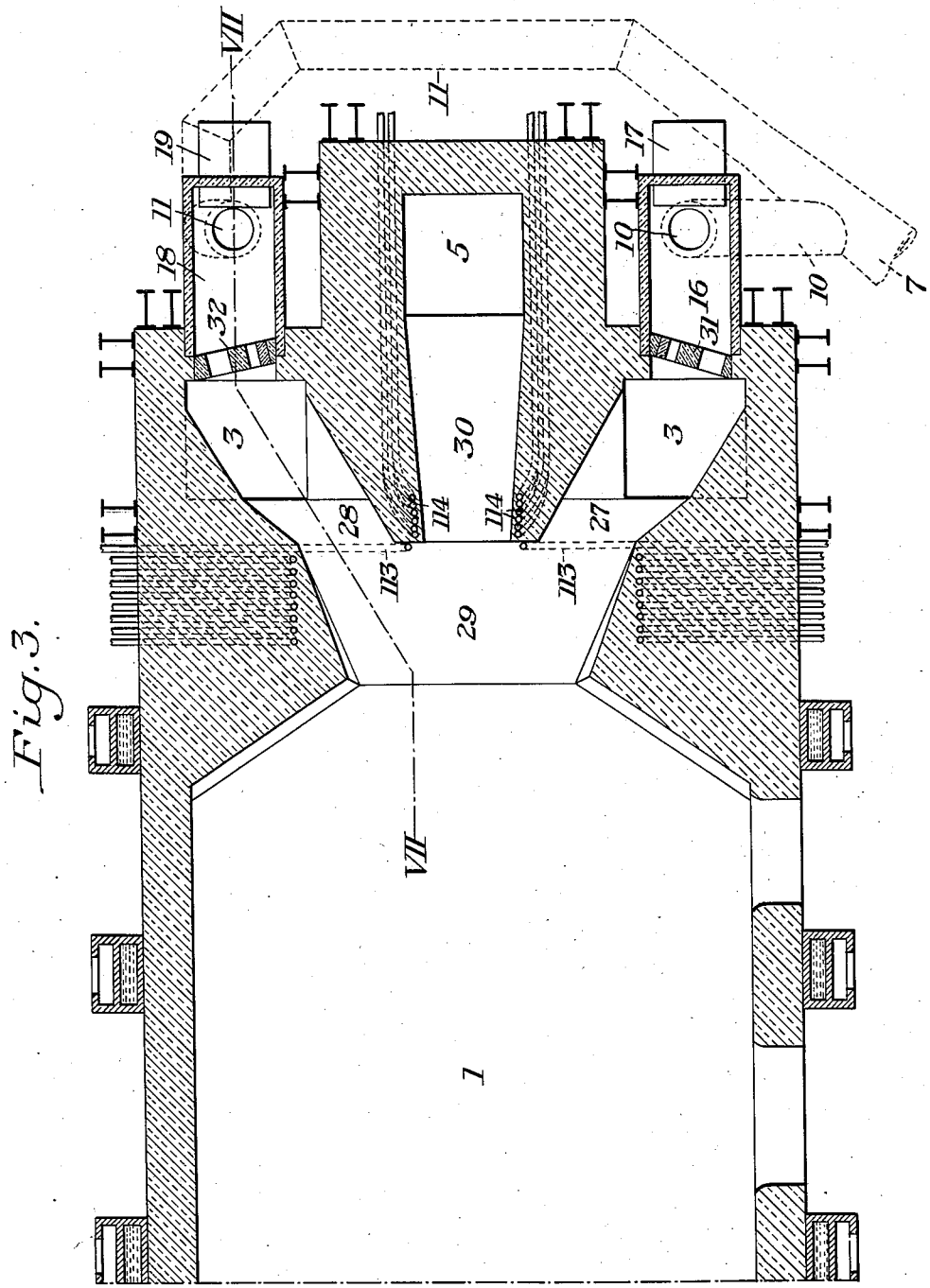
Figure 3 is a horizontal section through the air and gas ports at one end of the furnace.

Figure 2 shows the arrangement of the flues in the blast line regenerator. From the illustrations shown in Figures 1 and 2 it will be noted that the air enters a header with which three passages communicate. It then passes in the direction of the arrows shown in Figure 2 to a header at the other end of the regenerator into which the three passages discharge and to which the corresponding blast lines 6 and 7 are connected.

The gas regenerator 35 communicates with the stack flue 51 through a valve 52 of any suitable design. Likewise the regenerator 37 communicates with the stack flue through a valve 53. The air regenerator 39 communicates with the stack flue 51 through a valve 54 and the regenerator 41 likewise communicates with the stack flue through a valve 55. The stack is indicated at 56. The blast line 45 is provided with a valve 57 and the line 46 is provided with a similar valve 58. These valves are for the purpose of regulating the intensity of the blasts in lines 6 and 7 and the valves 13 and 15 are for the purpose of regulating the relation of the blasts through the branches 8 and 9 at one end of the furnace and the valves 17 and 19 are for the purpose of regulating the relation of the blasts in the branches 10 and 11 at the other end of the furnace.

Figure 4:
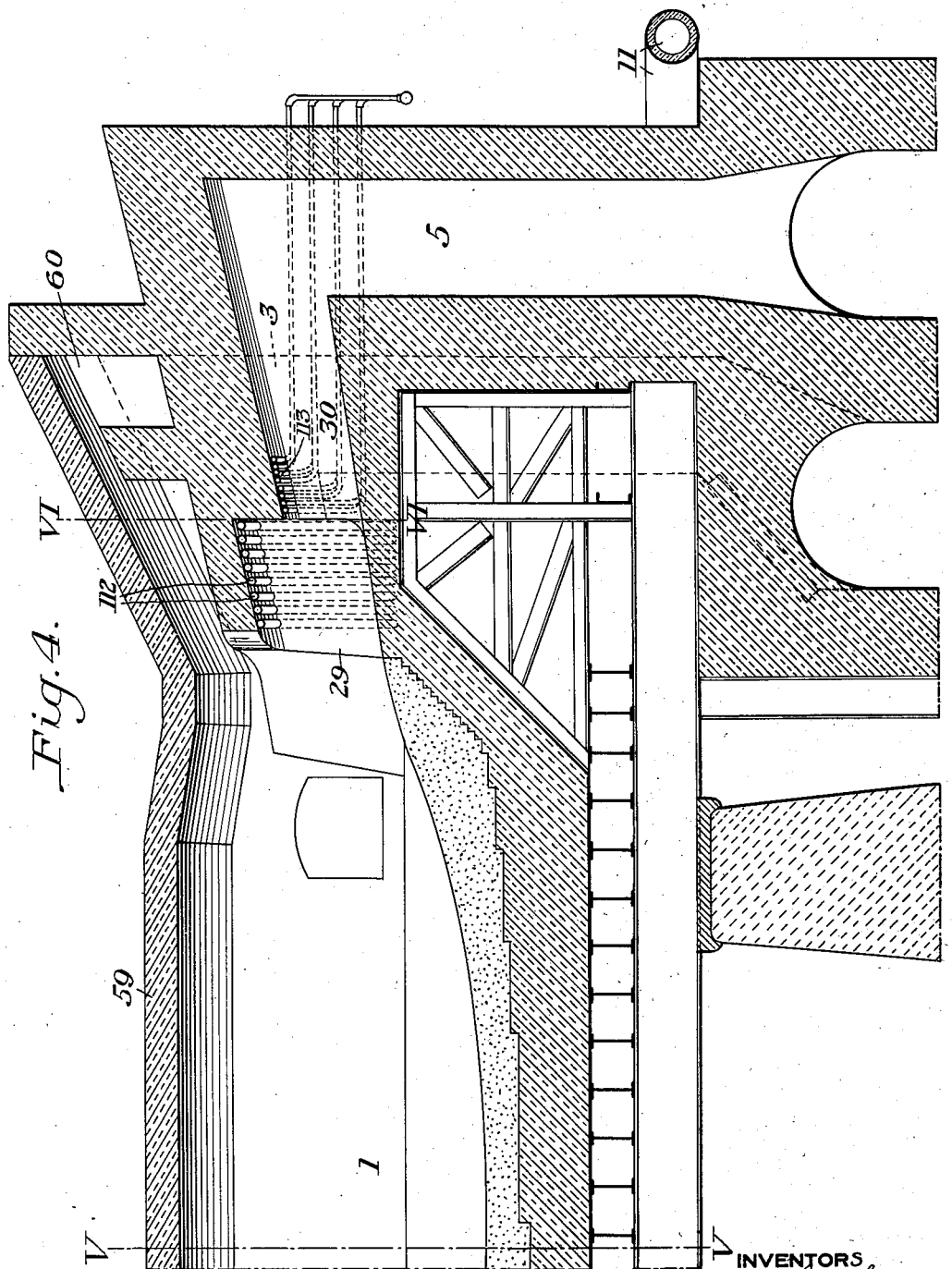
Figure 4 is a central longitudinal section of one end of the furnace.
Figure 5:
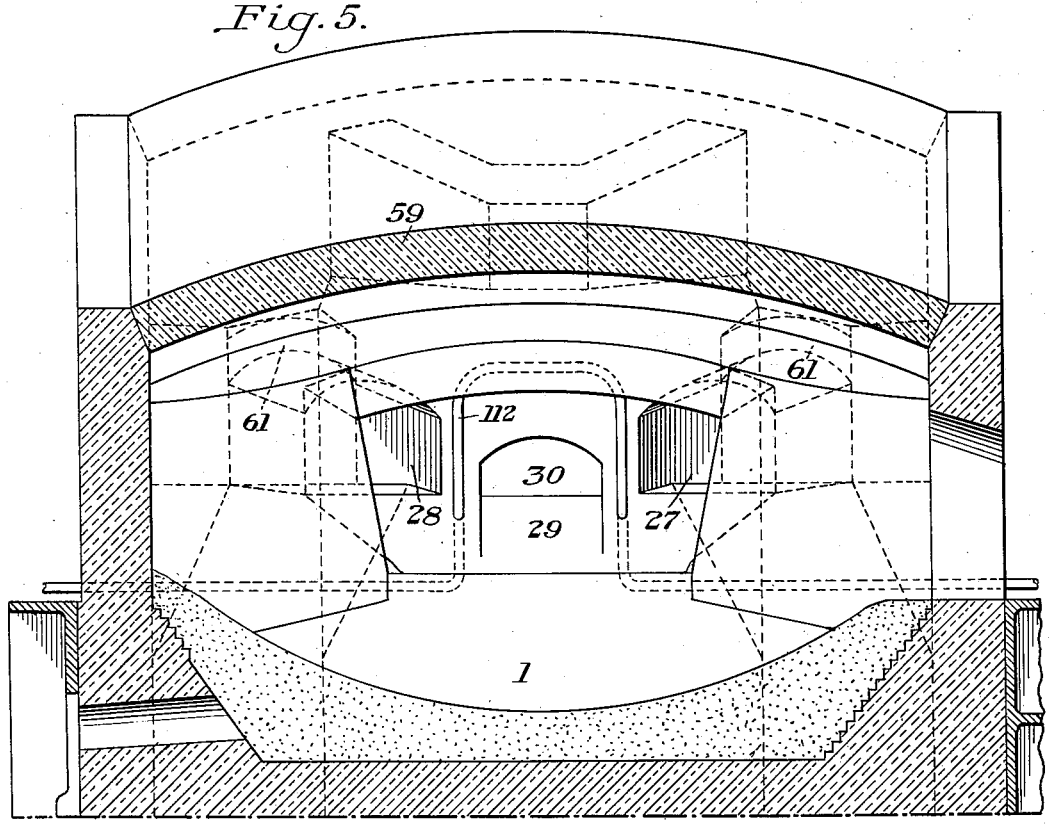
Figure 5 is a section on line V—V of Figure 4;
Figure 6:
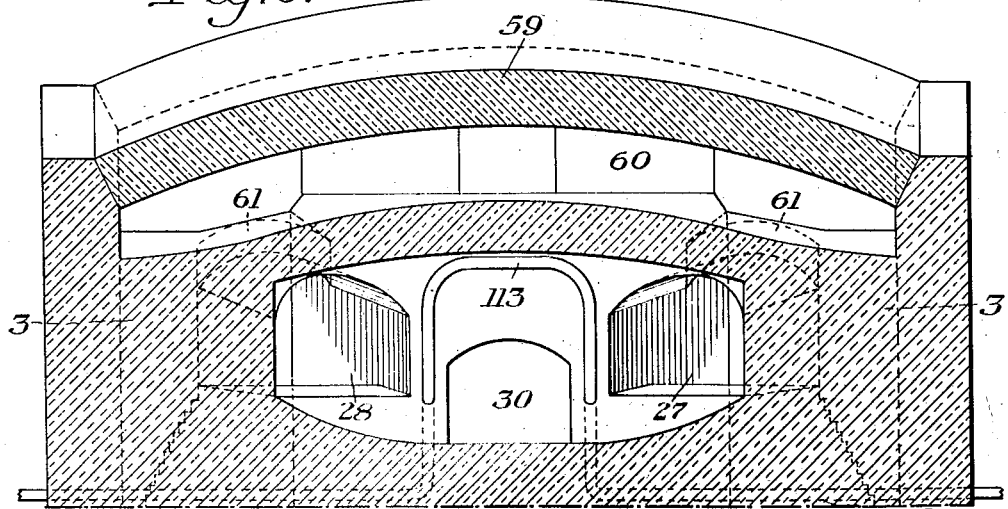
Figure 6 is a section on line VI—VI of Figure 4.

Referring to Figures 2, 4 and 7, the roof of the furnace is shown at 59. By the construction of the furnace as shown in these figures, a substantial space 60 is provided above the passages 27 and 28 through which passages 27 and 28 the main volume of air is forced and directed by the blasts from the chambers 16 and 18. A roof 61 is placed above the passages 27 and 28 as shown in Figure 2 and by reason of the passages 27 and 28, which are defined by the side walls and roof thereof, the main volume of air is directed by the air blasts through these defined converging passages at the ends of the furnace, as the result of which the air is thoroughly mixed with the gas which is drawn into the mixing chambers 23 and 29 at the ends of the furnace by an ejector or aspirating effect produced by the converging streams of air which meet in front of the open sides of the gas uptakes 4 and 5. The foregoing action takes place when the resultant velocities of the mixed streams of air in the chambers 23 and 29 are greater than that of the gas as it leaves the ports 24 and 30, respectively. If the resultant velocities of the air in the chambers 23 and 29 are lower than that of the gas as it leaves the ports 24 and 30, the gas will aspirate the air from the passages 20—21 and 27—28. The mixing area for the combustible gases is therefore localized in the ports at the ends of the furnace from which a thorough and efficient mixture results.

The air blasts at one end of the furnace are shut off when that end is acting as the discharge end of the furnace. Upon the shutting off of the blasts the space 60 becomes operative to allow the waste gases, which are larger in volume than the incoming combustible gases, to discharge over the top of the roof 61 of the passages 20—21 or 27—28. This additional space is therefore afforded to the increased volume of waste gases, whereby the gases are easily discharged from the furnace, without the employment of any movable parts.

By suitably adjusting the valves 57 and 58, the intensity of the blasts at the ends of the furnace may be regulated, and by properly adjusting the valves 13 and 15 the relation of the blasts through the passages 20 and 21 may be so adjusted as to control the mixing of the gases and also to control the direction of the flame in the furnace. By the proper adjustment of the blasts and normal air the fuel gas is enclosed in a moving body of air. This minimizes the destructive effect of the flame upon the brickwork of the side walls and roof.

The course of the waste gases is through the gas and air regenerators to the stack. These gases have the usual effect of heating up the regenerators and when the furnace is reversed the incoming air and gas passing through the heated regenerators are brought up to considerable temperature, which aids in the operation of the furnace in a well known manner.

It will be noted that the regenerators for the blast lines are placed inside the main air regenerators. This arrangement has the advantage that if a leak should develop in the blast line regenerators the air would not be lost but would be discharged into the main air regenerators and would pass into the furnace through the air uptakes.

Figure 13:
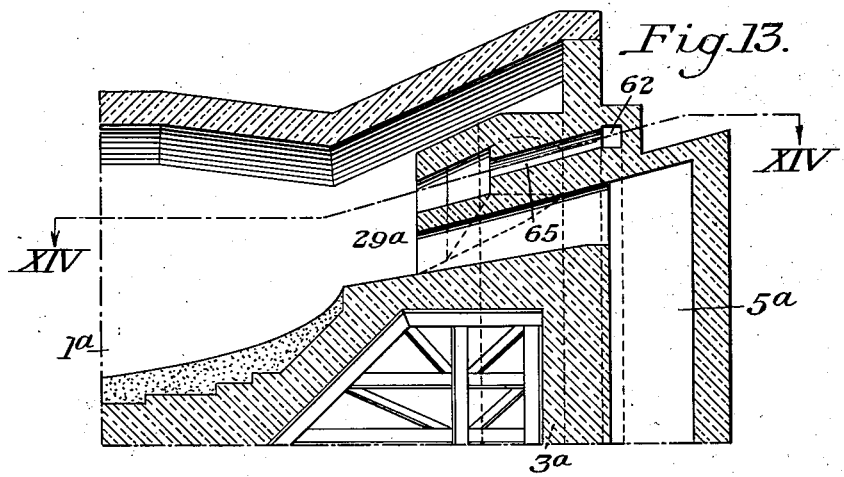
Figure 13 is a central longitudinal section of a part of a modified furnace embodying our invention.
Figure 14:
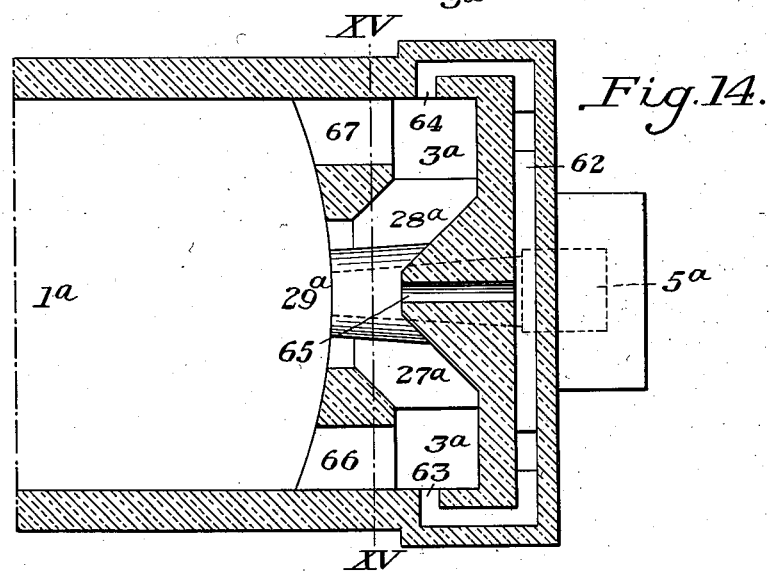
Figure 14 is a section on line XIV—XIV of Figure 13.
Figure 15:
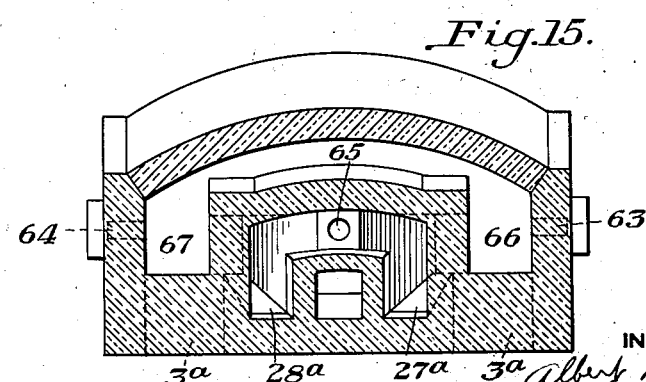
Figure 15 is a section on line XV—XV of Figure 14.

Figures 13, 14 and 15 show one end of a modified furnace embodying our invention. The other end of the furnace is a duplicate of that shown and the corresponding air and gas uptakes may be supplied through means like those heretofore described. The blast lines may also be supplied with gaseous medium by means like those heretofore described.

In the arrangement shown in these figures, the gas is supplied through the uptakes 5a and the air is supplied through the uptakes 3a. The air blast is supplied to the conduit 62 and discharges from that conduit through the blast openings 63 and 64. The blasts are directed across the air uptakes 3a and therefore force the main volume of air through the converging passages 27a and 28a into the mixing chamber 29a where the air is brought into contact with the gas from the gas uptake 5a and the two are thoroughly mixed together. The air issuing from the openings 63 and 64 is under considerably higher pressure than the air in the uptakes, and by reason of the difference in pressure and velocity the main volume of air is forced into contact with the gas and intimately mixed therewith. An air jet 65 may be used to force the mixture of air and gas from the mixing chamber 29a into the furnace. The combustible mixture is enclosed in a moving body of air as heretofore explained.

Discharge ports 66 and 67 are provided near the air uptakes as shown in Figure 14. During the period of combustion at the inlet end of the furnace, there is no substantial movement of either combustion gases or waste gases in these discharge ports because the jets of air issuing from the openings 63 and 64 have sufficient velocity to force the main volume of air for combustion through the converging passages 27a and 28a, and will not aspirate the burned gases from the furnace back into the air ports. The force of the air jets is sufficient to deflect the main volume of air from the uptakes into the passages 27a and 28a and will therefore allow no substantial part of it to travel through the discharge ports. By the arrangement shown therefore the fuel mixing area is localized in the ports so as to effect an efficient and thorough mixture of the gases whereas the ports 66 and 67 afford additional space for the exit of the waste gases without provision of any moving parts.

The arrangement shown in Figures 16 and 17 was designed for the purpose of giving to the air blasts a higher temperature than is imparted to the blasts by the arrangement heretofore described. In the arrangement of these figures the fan 42b discharges into a divided conduit 68. The conduit 68 connects with two pipes 69 and 70 which are placed in the stack flue 51b. The pipes 69 and 70 discharge into the wind box 44b and the air from the wind box is admitted to blast lines 45b and 46b through valves 49b and 50b which may be controlled by any suitable means, not shown. The blast lines 45b and 46b discharge into the preheating device 71 which may be used as a regenerator or as a recuperator.

That device consists of suitable walls in which is placed the checker-work 72. A blast line 46b discharges into a header 73 and from the header passes into three similar flues 74. The flues 74 pass throughout the length of the preheating device five times as shown in Figure 17, the air following the course indicated by the arrows. The walls of the different passages of each flue are separated as shown in Figure 17 by placing refractory material 75 therebetween. The adjacent flues 74 are also separated by refractory blocks 76 so that the waste gases passing through the checker-work passes entirely around each of the flues 74 and comes in contact with each wall of each of the flues throughout substantially the entire length of the flues. The flues 74 are connected with a header 77 from which they discharge into the blast pipe 78 which leads to one end of the furnace. The waste gases pass from the heating device into the stack flue and considerable heat is transferred from these gases to the air in the pipes 69 and 70. The blast line 45b is connected to a preheating device similarly to that shown in Figures 16 and 17 and the blast from that device is conducted to the other end of the furnace.

If the blast is passing through the preheater toward the furnace when the waste gases from the furnace are passing through the same device and going to the stack flue, the device would be considered as a recuperator, whereas if the blast were going through the device to the furnace while air is going through the checker-work to the furnace at the same time, the device would be considered as a regenerator. Whether or not, therefore, the device is considered a regenerator or a recuperator depends upon the relative flow of the gases through the flues 74 and the checker-work surrounding them.

In Figure 18 we have illustrated diagrammatically a modified arrangement for heating the blasts. In this arrangement the recuperator for heating the blasts is independent of the air and gas regenerators. The interior structure of the recuperator may be of any desired form. Waste gases are conducted from the air downtakes through the flues 79 or 80. These flues are provided with valves 81 and 82 respectively so that when the waste gases are passing through the flue 79, for instance, the valve 81 will be open and the valve 82 closed. The hot gases therefore discharge into the recuperator 83 and are discharged therefrom into the stack flue 84. The blast is forced into the recuperator 83 through the flue 85 and is discharged through the flue 86 which is divided, one line 87 going to one end of the furnace and the other line 88 going to the other end of the furnace. The line 87 is provided with a valve 89 and the line 88 with a valve 90. When the end A of the furnace is acting as the inlet for the combustible gases the valve 90 is open and the air blast is directed to that end of the furnace. The furnace shown diagrammatically in Figure 18 may have the detailed construction as shown in Figures 1 to 7 inclusive or that as shown in Figures 13 to 15 inclusive. The blasts which are discharged into the furnace ports may be separately controlled as shown in the arrangement of Figure 1.

Figure 19 shows a diagrammatic arrangement of a furnace layout similar to that shown in Figure 18 with the exception that the air blasts are passed through separate recuperators 91 and 92 which are placed in the air regenerators. A two-way valve 93 controls the passage of the blast from the fan 94. The air blast from the recuperator 92 is directed to the end B of the furnace and that passage from the recuperator 91 is passed to the end A of the furnace. It will be noted that the blast lines leading from the recuperators 91 and 92 cross each other on their way to the furnace so that when the waste gases are passing from the end B of the furnace through the regenerators as shown by the arrows the valve 93 is so positioned that the air blast is passing through the recuperator 91 in a direction opposite to that of the waste gases and the blast is carried to the end A of the furnace which is at that time being supplied with gas and air for heating the furnace. The furnace shown in Figure 19 may be of the construction shown either in Figures 1 to 7, inclusive, or Figures 13 to 15, inclusive. The air blasts at the ends of the furnace are separately controlled.

Figure 20 shows a furnace layout wherein the recuperator for the air blast is placed between the regenerators and the stack. In this arrangement all of the waste gases pass through the recuperator 95 and thereby heat the pipes 96 which are preferably of metal so that when the air blast passes through these pipes from the header 97 to the header 98 it will be heated to a high temperature. Blast lines 99 and 100 lead from the header 98 to the ends of the furnace and are provided with valves 101 and 102, respectively. By proper manipulation of the valves, the blast is directed to an end A or B of the furnace through the lines 100 or 99, respectively. The construction of the furnace shown in Figure 20 may be as shown in Figures 1 to 7, inclusive, or Figures 13 to 15, inclusive. The blasts at the ends of the furnace are independently regulated.

Figure 21 shows a furnace layout wherein there are two recuperators in series. The recuperator 103 is the same as the recuperator 95 shown in Figure 20. The recuperator 104 may be of any desired construction, such as that of the recuperator 83 of Figure 18. The blast passes through the recuperator 103 into the recuperator 104 and is conducted from the recuperator 104 into the ends A or B of the furnace through lines 105 or 106, respectively. The lines 105 and 106 are provided with valves 107 and 108 so that when the gases are passing to and from the furnace as shown by the arrows, the valve 107 will be open and the blast conducted through the line 105 to the end A of the furnace. The waste gases pass from the air downtakes to the recuperator 104 through line 109, the valve 110 being open. These gases from the recuperator 104 discharge into the stack flue 111. The waste gases which pass through the air and gas regenerators pass through the recuperator 103 and discharge into the stack flue. By this arrangement the air blasts are heated to a high temperature and a large amount of the heat is recovered from the waste gases.

The various parts of the ports and other parts of the furnace may be water cooled in any desired or suitable manner. By referring to Figures 3 to 7, inclusive, it will be noted that water pipes 112 are placed across the roof of the mixing chamber 29. A pipe 113 is placed on the nose of the gas ports 30 at each end of the furnace, and pipes 114 are placed in the side walls and across the roof of the gas ports 30 at each end of the furnace.

The arrangement of the pipes and form thereof may be changed as conditions require.

The different parts of the ports may be provided with any desired form of refractory material commonly used in the construction of heating furnaces. The different refractory materials such as chrome, magnesite and silica have not been separately indicated in the drawings, but it is to be understood that the furnace is to be provided with the different refractories in accordance with the well understood practice in this art. The uniform showing throughout the drawings for the various furnace walls is for the broad purpose of indicating that they are constructed of refractory material, it being apparent that the different parts are to be constructed according to the present practice.

From the foregoing description, it will be noted that there are no valves or dampers in the furnace structure for directing the passage of the fuel into or the waste gases from the furnace through the ports. The operation is controlled entirely by a gaseous medium, preferably one of the constituents of the fuel and all elaborate mechanisms of water cooled valves and dampers are eliminated.

Throughout the specification and claims we have used the terms "gas" and "gaseous medium". These terms when used herein have their physical meaning and are to be interpreted in a broad sense. For instance, the word "gas" is not to be interpreted herein as meaning merely fuel gas, but includes fuel gas, air or any other gaseous fluid.

Our invention has many advantages in that a simple and efficient arrangement is provided for mixing and directing the fuel and spent gases; there are no water cooled valves or dampers nor elaborate reversing mechanism; the recuperators and regenerators for the blasts may be placed in the air regenerator chambers whereby heat loss in the blast recuperators or regenerators due to leaks is absorbed in the air regenerating system; great flexibility is afforded in the inlet and outlet arrangement whereby steel may be made without the use of the blasts, although the blasts are much preferred; a large outlet area is provided for the waste gases and a small effective inlet area is provided for the mixing of the fuel gases without movable parts. This arrangement is conducive to a rapid exit of waste gases and a rapid and complete combustion of the fuel gases. By the use of our invention an increased tonnage is secured from the furnace with a given fuel consumption within a given time; a saving of fuel is effected because of the complete combustion thereof; a saving of brick is effected by reason of the provision of means for the accurate control of the direction of the flame; a higher metallic yield is secured due to a more rapid melting condition whereby the stack loss and other losses are decreased; means are provided by which the flame may be accurately controlled. By reason of the simplicity of these means the operation of the furnace requires less attention once the proper adjustment has been made; a saving of repair costs for the regenerators and flues is effected due to the completeness of combustion in the furnace as a result of which only waste gases pass through the regenerators and around the recuperators.

While we have shown and described several embodiments of our invention, we wish it to be understood that we are not limited to the exact arrangements shown and described, as many changes may be made in the details without departing from the spirit of our invention.

We claim:

1. In a regenerative furnace the combination of air and gas ports at the ends thereof, regenerators for the air and gas, auxiliary air lines to said ports and a preheating device for the auxiliary air.

2. In a regenerative furnace the combination of air and gas ports at the ends thereof, regenerators for the air and gas, auxiliary air lines to said ports and a preheating device in the air regenerator for said auxiliary air.

In testimony whereof we have hereunto set our hands.

ALBERT W. SMITH.
RICHARD B. JONES.